US008605087B2

(12) United States Patent
Everitt et al.

(10) Patent No.: US 8,605,087 B2
(45) Date of Patent: *Dec. 10, 2013

(54) HYBRID MULTISAMPLE/SUPERSAMPLE ANTIALIASING

(75) Inventors: Cass W. Everitt, Heath, TX (US); Steven E. Molnar, Chapel Hill, NC (US)

(73) Assignee: NVIDIA Corporation, Santa Clara, CA (US)

( * ) Notice: Subject to any disclaimer, the term of this patent is extended or adjusted under 35 U.S.C. 154(b) by 1000 days.

This patent is subject to a terminal disclaimer.

(21) Appl. No.: 12/167,998

(22) Filed: Jul. 3, 2008

(65) Prior Publication Data
US 2010/0002000 A1 Jan. 7, 2010

(51) Int. Cl.
G06T 15/50 (2011.01)
(52) U.S. Cl.
USPC ........... 345/426; 345/611; 345/612; 345/613; 345/614
(58) Field of Classification Search
USPC ......................................... 345/426, 611–614
See application file for complete search history.

(56) References Cited

U.S. PATENT DOCUMENTS

| 6,768,491 | B2 * | 7/2004 | Lefebvre et al. | 345/581 |
| 6,894,689 | B1 | 5/2005 | Greene et al. | |
| 6,967,663 | B1 * | 11/2005 | Bastos et al. | 345/613 |
| 7,173,631 | B2 * | 2/2007 | Anderson | 345/611 |
| 8,044,955 | B1 * | 10/2011 | Yhann | 345/423 |
| 2007/0229503 | A1 * | 10/2007 | Witzel et al. | 345/428 |
| 2008/0143720 | A1 * | 6/2008 | Elmquist | 345/426 |

OTHER PUBLICATIONS

Jason Mitchell, Direct3D Shader Models, Presentation in Game Developer's Conference 2004, Slides 41-43, http://developer.amd.com/media/gpu_assets/D3DTutorial_ShaderModels.pdf.*
Tomas Akenine-Moller, "Rendering Techniques 2006," A K Peters/CRC Press, 3rd edition, Aug. 15, 2006, p. 97.
Office Action in U.S. Appl. No. 12/167,997, mailed Apr. 25, 2011.

* cited by examiner

*Primary Examiner* — Said Broome
*Assistant Examiner* — Peter Hoang
(74) *Attorney, Agent, or Firm* — Patterson & Sheridan, LLP

(57) ABSTRACT

A system and method for dynamically adjusting the pixel sampling rate during primitive shading can improve image quality or increase shading performance. Hybrid antialiasing is performed by selecting a number of shaded samples per pixel fragment. A combination of supersample and multisample antialiasing is used where a cluster of sub-pixel samples (multisamples) is processed for each pass through a fragment shader pipeline. The number of shader passes and multisamples in each cluster can be determined dynamically for each primitive based on rendering state.

20 Claims, 7 Drawing Sheets

US 8,605,087 B2

HYBRID MULTISAMPLE/SUPERSAMPLE ANTIALIASING

FIELD OF THE INVENTION

Embodiments of the present invention relate generally to antialiasing techniques for graphics processing, and more specifically to dynamically adjusting the number of samples that are shaded per pixel fragment.

DESCRIPTION OF THE RELATED ART

Conventionally, graphics processors are configured to perform antialiasing by either multisampling or supersampling. In multisampling, each pixel fragment is shaded once and the resulting color value is replicated for all covered sub-pixel samples. In supersampling, each pixel fragment is shaded N times, once for each covered subpixel sample.

Multisampling is well-suited for antialiasing primitive edges, since what is important here is which samples are covered by the incoming primitive. Textures are typically prefiltered so shaded color values have sufficiently low spatial frequency that shading once per pixel is adequate. However, some effects, such as textured alpha transparency and high-frequency specular highlights may have higher-than pixel frequency and require that shading be done at higher than pixel frequency to avoid aliasing artifacts. Supersampling is typically required to avoid these types of aliasing. However, shading every sample in the pixel can be extremely expensive, since shading is typically the most expensive operation in rendering. Also, some supersampling implementations require input primitives to be processed multiple times, once for each sub-pixel sample, which creates additional inefficiencies. A shading rate larger than once per pixel but less than every sample may be sufficient to mitigate the causes of aliasing above.

Accordingly, what is needed in the art is a system and method for using a pixel shading rate that is appropriate for the current geometry being rendered. The shading rate may be decreased to improve image quality or decreased to improve shading performance.

SUMMARY OF THE INVENTION

A system and method for dynamically adjusting the pixel sampling rate during primitive shading can improve image quality or increase shading performance. The shading rate can vary anywhere from once per pixel (multisampling) to once per sample (supersampling), or anywhere in between to improve image quality or increase shading performance. Given a designated number of samples per pixel for a render target (image buffer), a number of shader passes is dynamically selected. A combination of supersample and multi-sample antialiasing is used where a cluster of sub-pixel samples (multisamples) is processed for each pass of a fragment shader. The supersample clusters are combined for each pixel to produce an antialiased pixel.

Various embodiments of a method of the invention for shading primitives using hybrid antialiasing in a computing device configured to generate multiple samples per pixel include receiving a graphics primitive, determining a number of supersample clusters that are used to antialias each pixel that intersects the graphics primitive, and shading the graphics primitive for each one of the supersample clusters. The graphics primitive is shaded using multiple passes through a fragment shading unit within the computing device, wherein the number of multiple passes used to produce each hybrid-antialiased pixel that intersects the graphics primitive is less than or equal to the number of supersample clusters.

Various embodiments of the invention include a computing device configured to shade graphics primitives using hybrid antialiasing. The computing device includes a rasterizer that is coupled to a fragment shading unit. The rasterizer includes a hybrid antialias control unit that is configured to receive the graphics primitives and determine a number of supersample clusters that are used to antialias each pixel that intersects the graphics primitives. The fragment shading unit is configured to shade the graphics primitives using multiple passes, wherein the number of multiple passes used to produce each hybrid-antialiased pixel that intersects a graphics primitive is less than or equal to the number of supersample clusters.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
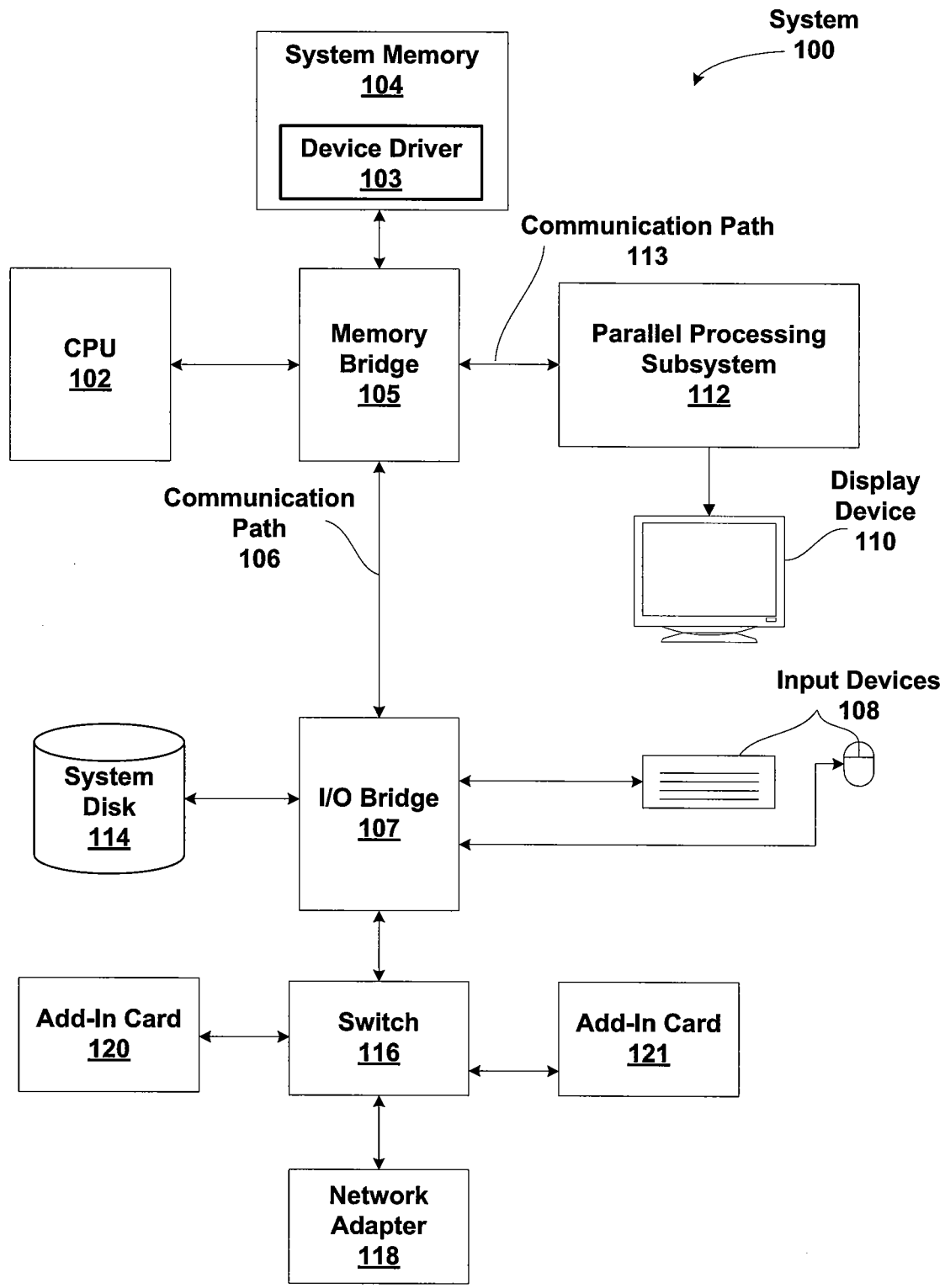
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that includes a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A device driver 103 that is stored in system memory 104, interfaces between processes executed by CPU 102, such as application programs, and parallel processing subsystem 112, translating program instructions as needed for execution by parallel processing subsystem 112.

A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

Figure 2:
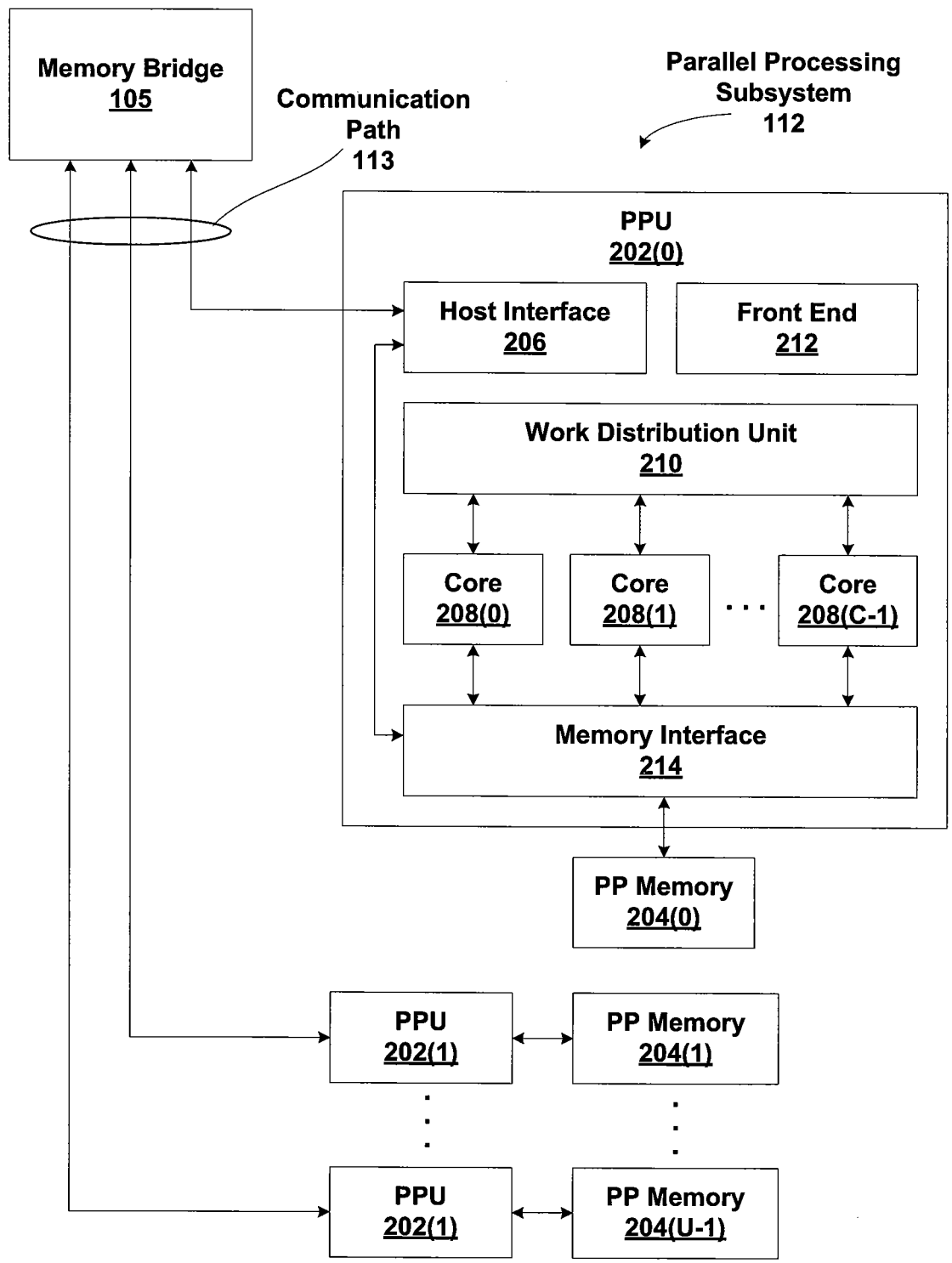
FIG. 2 is a block diagram of a parallel processing subsystem for the computer system of FIG. 1 in accordance with one or more aspects of the present invention.

An embodiment of parallel processing subsystem 112 is shown in FIG. 2. Parallel processing subsystem 112 includes one or more parallel processing units (PPUs) 202, each of which is coupled to a local parallel processing (PP) memory 204. In general, a parallel processing subsystem includes a number U of PPUs, where U≥1. (Herein, multiple instances of like objects are denoted with reference numbers identifying the object and parenthetical numbers identifying the instance where needed.) PPUs 202 and PP memories 204 may be implemented, for example, using one or more integrated circuit devices such as programmable processors, application specific integrated circuits (ASICs), and memory devices.

As shown in detail for PPU 202(0), each PPU 202 includes a host interface 206 that communicates with the rest of system 100 via communication path 113, which connects to memory bridge 105 (or, in one alternative embodiment, directly to CPU 102). In one embodiment, communication path 113 is a PCI-E link, in which dedicated lanes are allocated to each PPU 202 as is known in the art. Other communication paths may also be used. Host interface 206 generates packets (or other signals) for transmission on communication path 113 and also receives all incoming packets (or other signals) from communication path 113 and directs them to appropriate components of PPU 202. For example, commands related to processing tasks may be directed to a front end unit 212 while commands related to memory operations (e.g., reading from or writing to PP memory 204) may be directed to a memory interface 214. Host interface 206, front end unit 212, and memory interface 214 may be of generally conventional design, and a detailed description is omitted as not being critical to the present invention.

Each PPU 202 advantageously implements a highly parallel processor. As shown in detail for PPU 202(0), a PPU 202 includes a number C of cores 208, where C≥1. Each processing core 208 is capable of executing a large number (e.g., tens or hundreds) of threads concurrently, where each thread is an instance of a program; one embodiment of a multithreaded processing core 208 is described below. Cores 208 receive processing tasks to be executed via a work distribution unit 210, which receives commands defining processing tasks from a front end unit 212. Work distribution unit 210 can implement a variety of algorithms for distributing work. For instance, in one embodiment, work distribution unit 210 receives a "ready" signal from each core 208 indicating whether that core has sufficient resources to accept a new processing task. When a new processing task arrives, work distribution unit 210 assigns the task to a core 208 that is asserting the ready signal; if no core 208 is asserting the ready signal, work distribution unit 210 holds the new processing task until a ready signal is asserted by a core 208. Those skilled in the art will recognize that other algorithms may also be used and that the particular manner in which work distribution unit 210 distributes incoming processing tasks is not critical to the present invention.

Cores 208 communicate with memory interface 214 to read from or write to various external memory devices. In one embodiment, memory interface 214 includes an interface adapted to communicate with local PP memory 204, as well as a connection to host interface 206, thereby enabling the cores 208 to communicate with system memory 104 or other memory that is not local to PPU 202. Memory interface 214 can be of generally conventional design, and a detailed description is omitted.

Cores 208 can be programmed to execute processing tasks relating to a wide variety of applications, including but not limited to linear and nonlinear data transforms, filtering of video and/or audio data, modeling operations (e.g., applying laws of physics to determine position, velocity and other attributes of objects), image rendering operations (e.g., vertex shader, geometry shader, and/or pixel shader programs), and so on. PPUs 202 may transfer data from system memory 104 and/or local PP memories 204 into internal (on-chip) memory, process the data, and write result data back to system memory 104 and/or local PP memories 204, where such data can be accessed by other system components, including, e.g., CPU 102 or another parallel processing subsystem 112.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local PP memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs 202 may be identical or different, and each PPU 202 may have its own dedicated PP memory device(s) 204 or no dedicated PP memory device(s).

In operation, CPU 102 is the master processor of system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in FIG. 1), which may be located in system memory 104, PP memory 204, or another storage location accessible to both CPU 102 and PPU 202. PPU 202 reads the command stream from the pushbuffer and executes commands asynchronously with operation of CPU 102. Therefore, PPU 202 may be configured to offload processing from CPU 102 to increase the processing throughput and/or performance of system 100.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

The connection of PPU 202 to the rest of system 100 may also be varied. In some embodiments, PP system 112 is implemented as an add-in card that can be inserted into an expansion slot of system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

A PPU may be provided with any amount of local PP memory, including no local memory, and may use local memory and system memory in any combination. For instance, a PPU 202 can be a graphics processor in a unified memory architecture (UMA) embodiment; in such embodiments, little or no dedicated graphics (PP) memory is provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU to system memory, e.g., via a bridge chip.

As noted above, any number of PPUs 202 can be included in a parallel processing subsystem. For instance, multiple PPUs 202 can be provided on a single add-in card, or multiple add-in cards can be connected to communication path 113, or one or more of the PPUs 202 could be integrated into a bridge chip. The PPUs in a multi-PPU system may be identical to or different from each other; for instance, different PPUs might have different numbers of cores, different amounts of local PP memory, and so on. Where multiple PPUs 202 are present, they may be operated in parallel to process data at higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Core Overview

Figure 3:
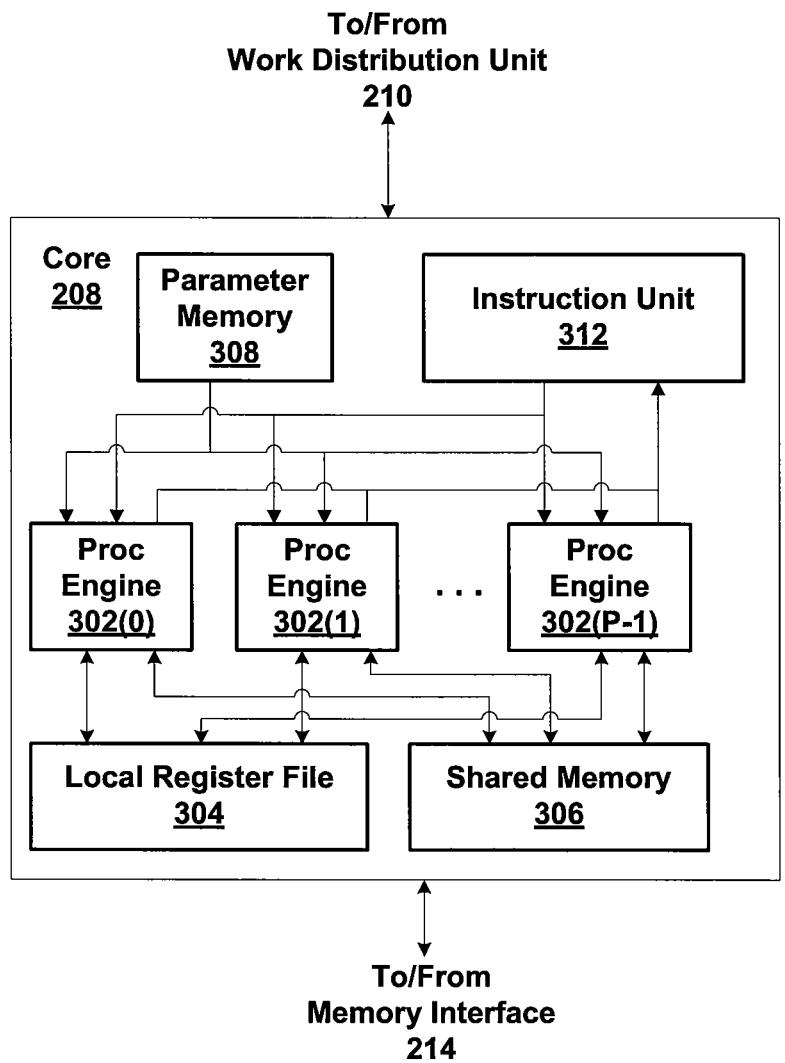
FIG. 3 is a block diagram of a core for the parallel processing subsystem of FIG. 2 in accordance with one or more aspects of the present invention.

FIG. 3 is a block diagram of a core 208 for the parallel processing subsystem 112 of FIG. 2, in accordance with one or more aspects of the present invention. PPU 202 includes a core 208 (or multiple cores 208) configured to execute a large number of threads in parallel, where the term "thread" refers to an instance of a context, i.e., a particular program executing on a particular set of input data. In some embodiments, single-instruction, multiple-data (SIMD) instruction issue techniques are used to support parallel execution of a large number of threads without providing multiple independent instruction units.

In one embodiment, each core 208 includes an array of P (e.g., 8, 16, etc.) parallel processing engines 302 configured to receive SIMD instructions from a single instruction unit 312. Each processing engine 302 advantageously includes an identical set of functional units (e.g., arithmetic logic units, etc.). The functional units may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

Each processing engine 302 uses space in a local register file (LRF) 304 for storing its local input data, intermediate results, and the like. In one embodiment, local register file 304 is physically or logically divided into P lanes, each having some number of entries (where each entry might store, e.g., a 32-bit word). One lane is assigned to each processing engine 302, and corresponding entries in different lanes can be populated with data for different threads executing the same program to facilitate SIMD execution. In some embodiments, each processing engine 302 can only access LRF entries in the lane assigned to it. The total number of entries in local register file 304 is advantageously large enough to support multiple concurrent threads per processing engine 302.

Each processing engine 302 also has access to an on-chip shared memory 306 that is shared among all of the processing engines 302 in core 208. Shared memory 306 may be as large as desired, and in some embodiments, any processing engine 302 can read to or write from any location in shared memory 306 with equally low latency (e.g., comparable to accessing local register file 304). In some embodiments, shared memory 306 is implemented as a shared register file; in other embodiments, shared memory 306 can be implemented using shared cache memory.

In addition to shared memory 306, some embodiments also provide additional on-chip parameter memory and/or cache(s) 308, which may be implemented, e.g., as a conventional RAM or cache. Parameter memory/cache 308 can be used, e.g., to hold state parameters and/or other data (e.g., various constants) that may be needed by multiple threads. Processing engines 302 also have access via memory interface 214 to off-chip "global" memory, which can include, e.g., PP memory 204 and/or system memory 104, with system memory 104 being accessible via host interface 206. It is to be understood that any memory external to PPU 202 may be used as global memory.

In one embodiment, each processing engine 302 is multi-threaded and can execute up to some number G (e.g., 24) of threads concurrently, e.g., by maintaining current state information associated with each thread in a different portion of its assigned lane in local register file 304. Processing engines 302 are advantageously designed to switch rapidly from one thread to another so that instructions from different threads can be issued in any sequence without loss of efficiency. Since each thread may correspond to a different context, multiple contexts may be processed over multiple cycles as different threads are issued for each cycle.

Instruction unit 312 is configured such that, for any given processing cycle, an instruction (INSTR) is issued to each of P processing engines 302. Each processing engine 302 may receive a different instruction for any given processing cycle when multiple contexts are being processed simultaneously. When all P processing engines 302 process a single context, core 208 implements a P-way SIMD microarchitecture. Since each processing engine 302 is also multithreaded, supporting up to G threads concurrently, core 208 in this embodiment can have up to P*G threads executing concurrently. For instance, if P=16 and G=24, then core 208 supports up to 384 concurrent threads for a single context or N*24 concurrent threads for each context, where N is the number of processing engines 302 allocated to the context.

Operation of core 208 is advantageously controlled via a work distribution unit 210. In some embodiments, work distribution unit 210 receives pointers to data to be processed (e.g., primitive data, vertex data, and/or pixel data) as well as locations of pushbuffers containing data or instructions defining how the data is to be processed (e.g., what program is to be executed). Work distribution unit 210 can load data to be processed into shared memory 306 and parameters into parameter memory 308. Work distribution unit 210 also initializes each new context in instruction unit 312, then signals instruction unit 312 to begin executing the context. Instruction unit 312 reads instruction pushbuffers and executes the instructions to produce processed data. When execution of a context is completed, core 208 advantageously notifies work distribution unit 210. Work distribution unit 210 can then initiate other processes, e.g., to retrieve output data from shared memory 306 and/or to prepare core 208 for execution of additional contexts.

It will be appreciated that the parallel processing unit and core architecture described herein is illustrative and that variations and modifications are possible. Any number of processing engines may be included. In some embodiments, each processing engine 302 has its own local register file, and the allocation of local register file entries per thread can be fixed or configurable as desired. In particular, entries of local register file 304 may be allocated for processing each context. Further, while only one core 208 is shown, a PPU 202 may include any number of cores 208, which are advantageously of identical design to each other so that execution behavior does not depend on which core 208 receives a particular processing task. Each core 208 advantageously operates independently of other cores 208 and has its own processing engines, shared memory, and so on.

Graphics Pipeline Architecture

Figure 4:
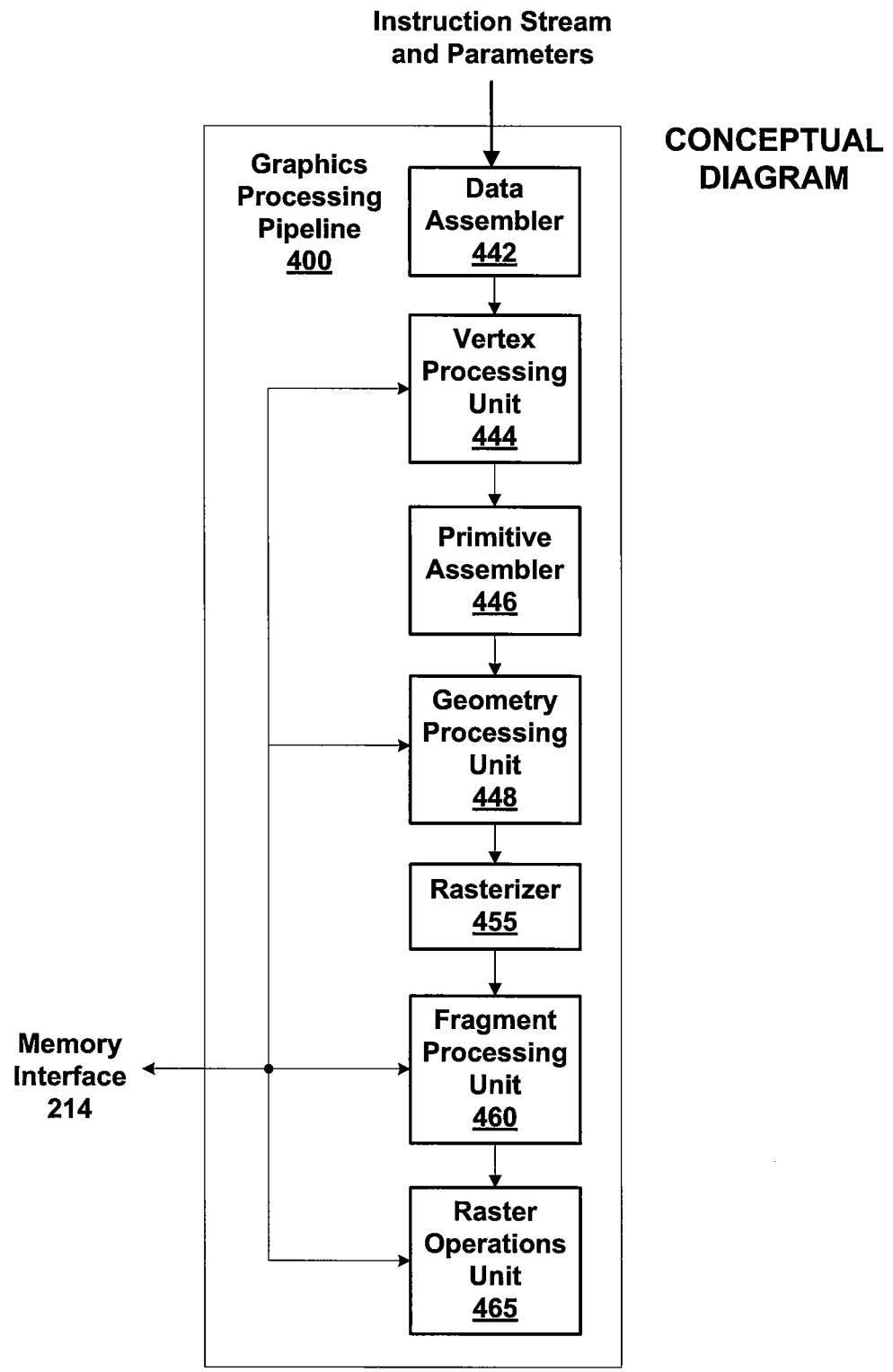
FIG. 4 is a conceptual diagram of a graphics processing pipeline in accordance with one or more aspects of the present invention.

FIG. 4 is a conceptual diagram of a graphics processing pipeline 400, in accordance with one or more aspects of the present invention. PPU 202 may be configured to form a graphics processing pipeline 400. For example, core 208 may be configured to perform the functions of one or more of a vertex processing unit 444, geometry processing unit 448, and a fragment processing unit 460. The functions of data assembler 442, primitive assembler 446, rasterizer 455, and raster operations unit 465 may also be performed by core 208. Alternately, graphics processing pipeline 40 may be implemented using dedicated processing units for one or more of vertex processing unit 444, geometry processing unit 448, fragment processing unit 460, data assembler 442, primitive assembler 446, rasterizer 455, and raster operations unit 465.

Data assembler 442 is a processing unit that collects vertex data for high-order surfaces, primitives, and the like, and outputs the vertex data to vertex processing unit 444. Vertex processing unit 444 is a programmable execution unit that is configured to execute vertex shader programs, transforming vertex data as specified by the vertex shader programs. For example, vertex processing unit 444 may be programmed to transform the vertex data from an object-based coordinate representation (object space) to an alternatively based coordinate system such as world space or normalized device coordinates (NDC) space. Vertex processing unit 444 may read data that is stored in PP memory 204 or system memory 104 for use in processing the vertex data.

Primitive assembler 446 receives processed vertex data from vertex processing unit 444 and constructs graphics primitives, e.g., points, lines, triangles, or the like, for processing by geometry processing unit 448. Geometry processing unit 448 is a programmable execution unit that is configured to execute geometry shader programs, transforming graphics primitives received from primitive assembler 446 as specified by the geometry shader programs. For example, geometry processing unit 448 may be programmed to subdivide the graphics primitives into one or more new graphics primitives and calculate parameters, such as plane equation coefficients, that are used to rasterize the new graphics primitives. In some embodiments of the present invention, geometry processing unit 448 may also add or delete elements in the geometry stream. Geometry processing unit 448 outputs the parameters and vertices specifying new graphics primitives to rasterizer 455 or to memory interface 214. Geometry processing unit 448 may read data that is stored in PP memory 204 or system memory 104 for use in processing the geometry data.

Rasterizer 455 scan converts the new graphics primitives and outputs fragments and coverage data to fragment processing unit 260. When antialiasing is used to produce image data, rasterizer 455 is configured to produce sub-pixel sample coverage data. When hybrid antialiasing is used, a hybrid antialias control unit 500, which may reside in rasterizer 455, is configured to determine the number of passes through fragment processing unit 460 that are used to process each primitive, as described in conjunction with FIGS. 5C and 6.

Fragment processing unit 460 is a programmable execution unit that is configured to execute fragment shader programs, transforming fragments received from rasterizer 455 as specified by the fragment shader programs. For example, fragment processing unit 460 may be programmed to perform operations such as perspective correction, texture mapping, shading, blending, and the like, to produce shaded fragments that are output to raster operations unit 465. Fragment processing unit 460 may read data that is stored in PP memory 204 or system memory 104 for use in processing the fragment data. Fragments may be shaded at pixel, sample, or supersample cluster granularity, depending on the sampling rate chosen by the hybrid antialias control unit.

Memory interface 214 produces read requests for data stored in graphics memory and performs texture filtering operations, e.g., bilinear, trilinear, anisotropic, and the like. In some embodiments of the present invention, memory interface 214 may be configured to decompress data. In particular, memory interface 214 may be configured to decompress fixed length block encoded data, such as compressed data represented in a DXT format. Raster operations unit 465 is a processing unit that performs raster operations, such as stencil, z test, and the like, and outputs pixel data as processed graphics data for storage in graphics memory. The processed graphics data may be stored in graphics memory, e.g., PP memory 204, and/or system memory 104, for display on display device 110 or for further processing by CPU 102 or parallel processing subsystem 112. In some embodiments of the present invention, raster operations unit 465 is configured to compress z or color data that is written to memory and decompress z or color data that is read from memory.

Hybrid Antialiasing

As previously described, PPU 202 may be configured to perform shading at various sampling rates to improve image quality or improve shading performance. A hybrid antialias control unit determines a number of shader passes that are used to shade each pixel within a primitive. A supersample cluster of one or more multisamples (sub-pixel samples) per pixel is processed by a core 208 configured as fragment processing unit 460 for each pass to produce a single shaded color value that is replicated for all of the multisamples in the supersample cluster. After a scene is rendered, the samples for the supersample clusters are combined to produce an antialiased image.

The number of sub-pixel samples and shader passes for each primitive is increased to improve image quality. The number of sub-pixel samples is determined when the application is launched and is consistent for each pixel of a render target (image buffer). The hybrid antialias control unit may dynamically determine the number of shading passes, based on the rendering state, e.g., alpha test enable/disable, texture map content, user provided quality/performance controls, or the like.

Figure 5A:
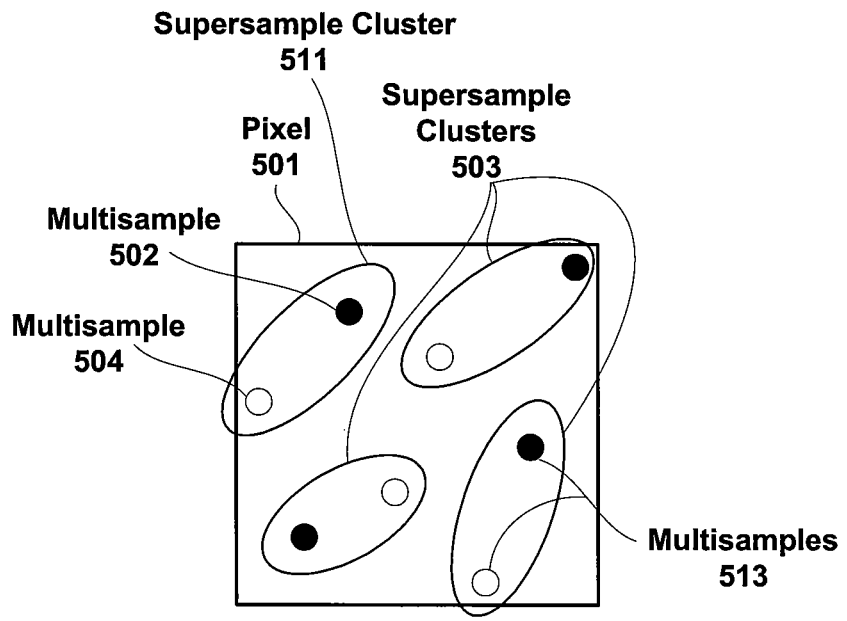
FIG. 5A illustrates supersample clusters and multisample positions within a pixel in accordance with one or more aspects of the present invention.

FIG. 5A illustrates supersample clusters 503 and 511 and multisamples 502, 504, and 513 within a pixel 501, in accordance with one or more aspects of the present invention. When eight sub-pixel sample antialiasing is used a variety of different combinations of multisamples and supersamples clusters may be used to produce the eight sub-pixel samples. In the example shown in FIG. 5A, three supersample clusters 503 and supersample cluster 511 each include two multisamples, such as multisamples 502 and 504 in supersample cluster 511, for a total of eight sub-pixel sample positions with pixel 501. Other eight sub-pixel sample configurations include as many as eight supersample clusters with one multisample each or as few as one supersample clusters with eight multisamples. Shading is performed once for each supersample cluster, and the shaded value, e.g., color, is stored for all of the multisamples within the supersample cluster.

Shader attributes may be sampled at the location of a specific multisample in the supersample cluster, or they may be sampled at some other location in or near the supersample cluster. For example, in FIG. 5A fragment attributes (color, texture coordinates, and the like) may be sampled at the solid multisample positions, such as multisample 502 in supersample cluster 511. Furthermore, when fragments only partially cover a supersample cluster, it may be advantageous to adjust the location at which attributes are sampled to lie within the region of covered multisamples in the supersample cluster. This is commonly known as centroid sampling, although the term is applied here to supersample clusters, rather than to entire pixel fragments.

Figure 5B:
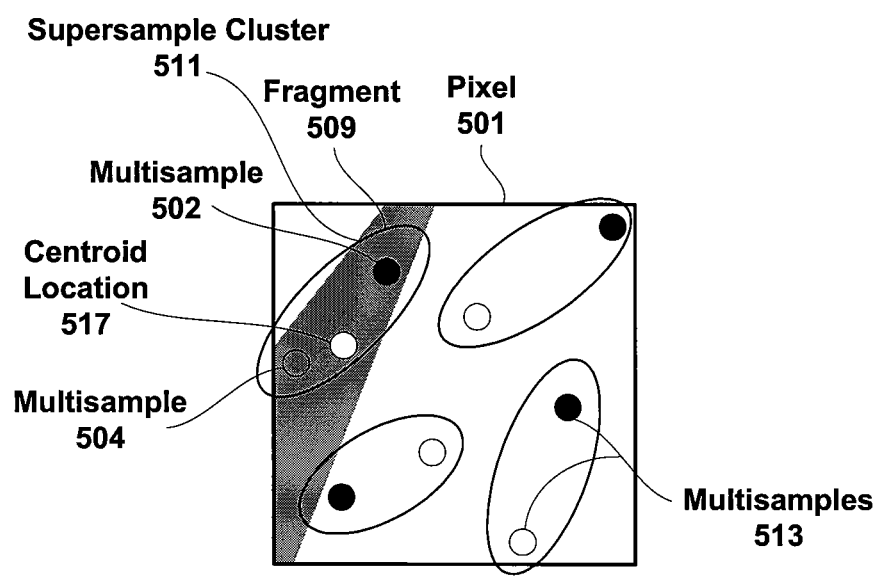
FIG. 5B illustrates a fragment and a centroid position within a multisample cluster in accordance with one or more aspects of the present invention.

FIG. 5B illustrates fragment 509 and a centroid location 517 within a supersample cluster 511, in accordance with one or more aspects of the present invention. In some embodiments of the present invention, centroid sampling is used to modify the position at which attributes are evaluated to better correspond to the screen area actually covered by the fragment. In some embodiments of the present invention, the sample interpolation unit 510 may be configured to sample each supersample cluster at a particular multisample location or at an approximated centroid location.

The centroid may be a geometric centroid of the covered multisamples, or it may be approximated, for example, by choosing the covered multisample in the supersample cluster that is closest to the centroid of the fully-covered supersample cluster. For example, a centroid location 517 is a computed multisample position at the geometric center of supersample cluster 511 that is used to represent the sampled color for supersample cluster 511 since the position of multisample 502 is near an edge rather than near the center of fragment 509. A shaded value is computed at centroid location 517 to more accurately represent the fragment color compared with multisample 502.

Figure 5C:
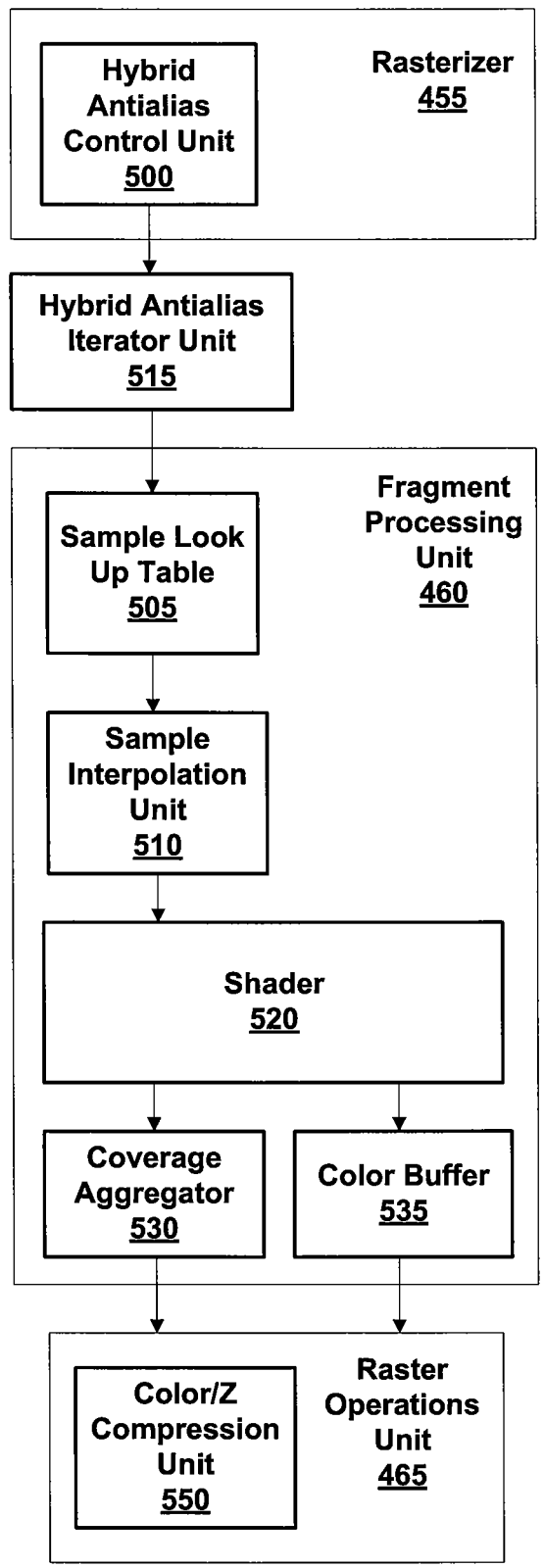
FIG. 5C is a block diagram of a portion of the graphics processing pipeline in accordance with one or more aspects of the present invention.

FIG. 5C is a block diagram of a portion of graphics processing pipeline 400 including rasterizer 455, fragment processing unit 460, and raster operations unit 465, in accordance with one or more aspects of the present invention. Other processing units may be included within rasterizer 455, fragment processing unit 460, and raster operations unit 465. Those other processing units are not shown in FIG. 5C since they may be of generally conventional design, and a detailed description is omitted as not being critical to the present invention.

Rasterizer 455 receives primitives from geometry processing unit 448 and produces a fragment for each pixel that the primitive intersects. A hybrid antialias control unit 500 (optionally within rasterizer 455) may be configured to dynamically determine the number of shader passes that are used to process the fragments of each primitive, based on the rendering state, e.g., alpha test enable/disable, texture map content, user provided quality/performance controls, or the like.

Hybrid antialias control unit 500 improves antialiasing efficiency by performing more shading passes for primitives that will benefit from a higher shadowing rate and reducing the shading rate for other primitives. Hybrid antialias control unit 500 may be configured by the user, the application, or device driver 103, to operate in a variety of quality settings. These could range from a lowest quality setting "multisample-always" to a highest quality setting "supersample always." Intermediate quality settings may consider render pipeline state in determining the number of shading passes. For example, if alpha test or shader pixel kill are enabled, more shading passes may be desirable. Conversely, when high performance is specified, alpha test, and shader pixel kill are disabled, the sampling rate may be decreased by hybrid antialias control unit 500. Hybrid antialias control unit 500 may also consider characteristics of the pixel shader or texture sampler settings in determining the number of shading passes. Persons skilled in the art will recognize that a wide variety criteria could be used by hybrid antialias control unit 500 to determine the number of shading passes. In conventional graphics systems the sampling rate is determined for all of the primitives in a scene based on user provided or fixed settings. Furthermore, the sampling for the conventional systems is limited to multisampling or supersampling, and not the intermediate alternatives.

In one embodiment, rasterizer 455 generates 2×2 quads of pixel fragments, which are received by hybrid antialias iterator unit 515. When hybrid antialias control unit 500 sets passes=1 (i.e. when multisampling), hybrid antialias iterator unit 515 passes these quads unmodified to fragment processing unit 460. However, when hybrid antialias control unit 500 sets passes to N>1, hybrid antialias iterator unit 515 outputs each quad to fragment processing unit 460 multiple times, including a pass number corresponding to the shader pass. Hybrid antialias iterator unit 515 may mask coverage sent to fragment processing unit 460 such that only multisamples within the supersample cluster corresponding to the current pass are enabled. In other embodiments, fragment processing unit 460 may mask coverage based on the pass number provided to it by hybrid antialias iterator unit 515. Note that other embodiments may iterate over a region other than a 2×2-fragment quad, such as a single pixel, a 4×4-fragment tile, or the like. Iterating over regions of pixels (quads) rather than primitives may be advantageous, since texture map data is likely to be reused for subsequent shader passes for a particular quad, whereas iterating over primitives, which can be large, can cause texture data to be refetched from memory, e.g., PP memory 204 or system memory 104.

Importantly, the geometry computations needed to generate the fragments are not repeated for each shader pass. In contrast, conventional systems that use a sample mask to supersample into a multisample buffer typically repeat the geometry computations for each shader pass. Note that primitive attributes that are sampled in fragment processing unit 460 need only be computed once, regardless of the number of hybrid antialiasing passes, since they will be referenced by subsequent iterated quads and can then be discarded.

A sample look up table in fragment processing unit 460 uses the hybrid antialiasing parameters and pass number to determine the location where interpolated fragment parameters are sampled. Sample look up table 505 may select a centroid position or a multisample position for each supersample cluster. The multisample positions are output to a sample interpolation unit 510 that computes one or more interpolated parameters, e.g., color channels (red, green, blue, alpha), texture coordinates, and the like, for each supersample cluster, i.e., one set of interpolated parameters for each pixel in the pixel quad. A shader 520 processes the set of interpolated parameters for each pixel in the pixel quad, using techniques known to those skilled in the art to execute a fragment shader program, or the like, to produce a shaded pixel value, e.g., color, for each supersample cluster.

During shading the sub-pixel samples for each supersample cluster may be eliminated (culled or killed) as a result of alpha testing or shader pixel kill so that raster-generated coverage is modified to produce post-shader coverage based on the pixel kill or alpha test results. Since the supersample clusters are processed in separate passes through shader 520, supersample clusters may be eliminated individually during alpha testing. In contrast, when conventional multisampling is used to process all of the sub-pixel samples in a single shading pass, all of the sub-pixel samples are either kept or eliminated, resulting in a coarser alpha-testing granularity that produces a lower quality image.

Shader 520 outputs the shaded pixel values and sub-pixel coverage (possibly modified compared with the coverage provided by rasterizer 455) to a color buffer 535 and a coverage aggregator 530, respectively. Coverage aggregator 530 accumulates the post-shader coverage for each shader pass to produce aggregated coverage information for each pixel. Color buffer 535 accumulates the shaded values for each pixel. When the shaded values for the last shader pass are received, the aggregated coverage information is output to raster operations unit 465. The shaded values for the pixel quad may be output with the aggregated coverage information or may be output at a later time, for example after z testing is completed by raster operations unit 465. In other embodiments of the present invention, coverage aggregator 530 and color buffer 535 may be omitted.

Coverage aggregation and coalescing of color values into a color buffer are advantageous in systems which pack the samples of each pixel together in memory, so that multiple samples can be written or read using a single memory transaction. Other embodiments may omit coverage aggregator 530. Coverage aggregator 530 may be less advantageous in systems that do not store sample values for a pixel contiguously in memory.

An optional color/z compression unit 550 within raster operations unit 465 receives the aggregated coverage information and z values or another representation of z or depth values for the fragments (following z testing) and produces compressed z values for a region of pixels. Color/z compression unit 550 may also receive aggregated color values for the fragments and produce compressed color values for a region of pixels. The compression may be improved when applied to a larger group of pixels. Therefore, several pixel quads may be aggregated together and z tested before the result is compressed. Importantly, hybrid antialiasing does not preclude or diminish the effectiveness of z compression. Z compression is advantageously used to reduce the memory bandwidth requirements for accessing the z buffer, and, in some embodiments, the memory footprint as well.

Figure 6:
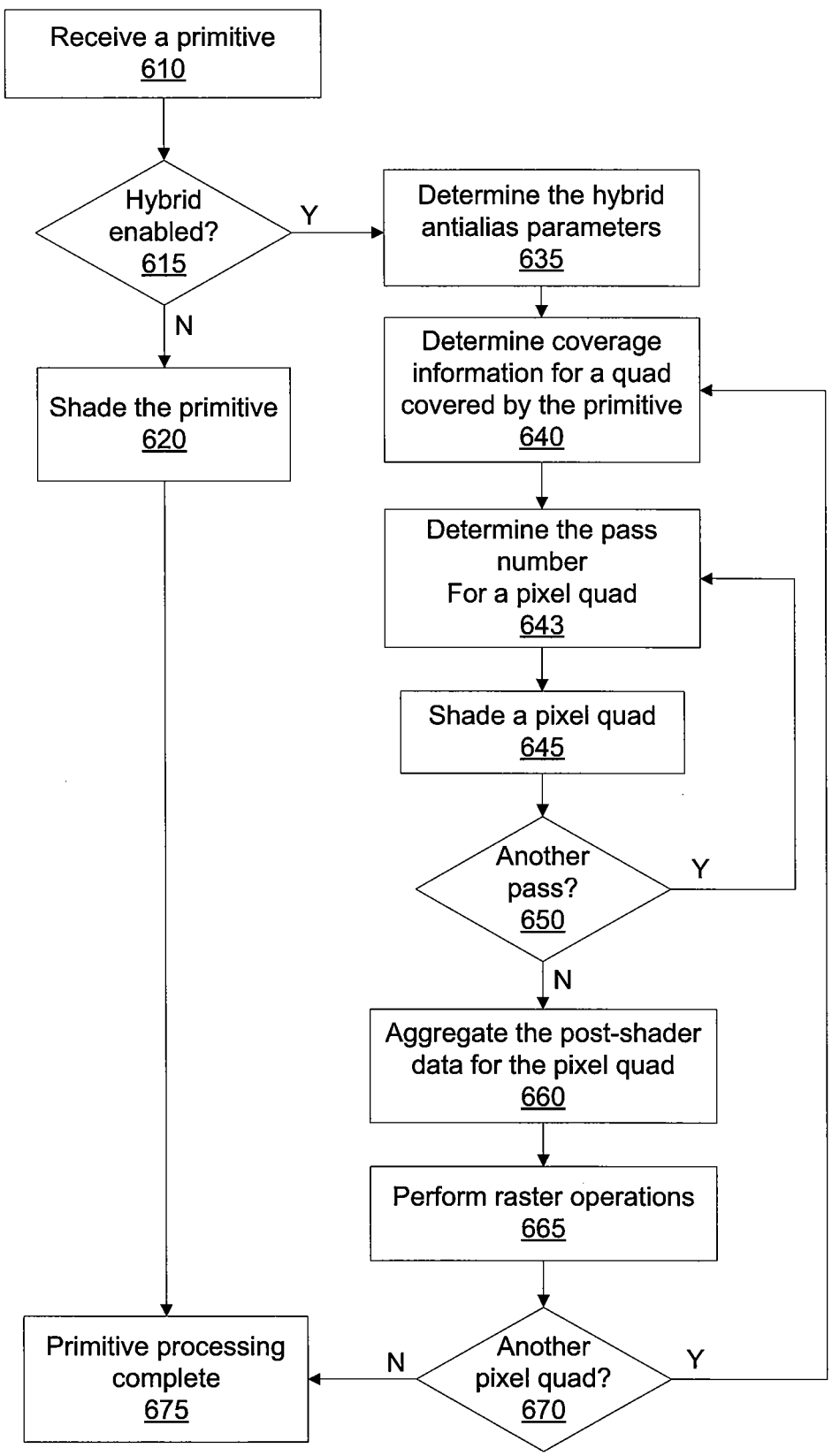
FIG. 6 is a flow diagram of method steps for performing hybrid antialiasing in accordance with one or more aspects of the present invention.

FIG. 6 is a flow diagram of method steps for performing hybrid antialiasing, in accordance with one or more aspects of the present invention. In step 610 hybrid antialias control unit 500 receives a primitive. In step 615 hybrid antialias control unit 500 determines if hybrid antialiasing is enabled, and, if not, the fragment is processed using conventional antialiasing. If, in step 615 hybrid antialiasing is enabled, then in step 635 hybrid antialias control unit 500 determines the hybrid antialias parameters for the primitive. More specifically, hybrid antialias control unit 500 determines the number of supersample clusters (shader passes) to be used when shading each pixel intersected by the primitive.

In step 640 Rasterizer 455 generates sample level coverage for covered portions of the primitive. The granularity of this coverage may be coarse or fine, but is at least the size of a pixel quad. Rasterizer 455 outputs coverage information for a quad that intersects the primitive to hybrid antialias iterator unit 515. Hybrid antialias iterator unit 515 expands each quad based on the hybrid anti-alias parameters to shade the quad in multiple passes. Hybrid antialias iterator unit 515 may be configured to skip shader passes when all of the multisamples in a supersample cluster are not covered, according to the coverage information. In step 643 hybrid antialias iterator unit 515 determines the pass number (first, second, etc.) and outputs the pixel quad and pass number to the fragment processing unit 460. As previously described, when the number of passes is greater than one, hybrid antialias iterator unit 515 may mask the coverage information. Sample look up table 505 is indexed using the pass number and the number of multisamples to read a programmed value for the multisample positions, including an indication of the location within the supersample cluster that is used to interpolate the fragment parameters. Interpolated parameters are computed for the supersample cluster by sample interpolation unit 510.

In step 645 fragment processing unit 460 shades the pixel quad, producing a shaded value for each supersample cluster, i.e., one shaded value for each pixel in the pixel quad. Within a supersample cluster, the shaded value will be used for each multisample that is covered by the primitive. Fragment processing unit 460 also outputs post-shader coverage for the pixel quad. The post-shader coverage may differ from the rasterized pixel coverage information since multisamples may be eliminated during shading, as previously described.

In step 650 hybrid antialias iterator unit 515 determines if another shader pass will be used to process the pixel quad, and, if so, steps 643 and 645 are repeated for another shader pass (second, third, etc.). If, in step 650 hybrid antialias iterator unit 515 determines that another shader pass is not needed to process the pixel quad, then in step 660 coverage aggregator 530 combines the post-shader coverage for each of the shader passes to produce the aggregated coverage information for the pixel quad. In step 660 coverage aggregator 530 may also combine the post-shader color values for each of the shader passes to produce the aggregated color values for the pixel quad. Coverage aggregator 530 can be configured to aggregate post-shader color and coverage information at a multi-quad level. In step 665 raster operations unit 465 performs the raster operations to determine which shaded values will be written to the frame buffer. The raster operations may be performed at the quad or multi-quad level. Color/z compression unit 550 within raster operations unit 465 may be used to compress the z and/or color data for the pixel quad before the z and/or color data is stored in the z buffer and/or color buffer.

In step 670 rasterizer 455 determines if another pixel quad intersects with the primitive, and, if so, then in step 640 rasterizer 455 processes a different pixel quad that is covered by the primitive. If, in step 670 rasterizer 455 determines that all of the pixel quads intersected by the primitive have been shaded, then in step 675 the primitive processing is complete. In a pipelined system, one or more of the steps shown in FIG. 6 may be performed in parallel for different quads.

Hybrid antialias control unit 500 may dynamically determine the hybrid antialiasing parameters for each primitive, e.g., number of supersample clusters per pixel, based on the rendering state, e.g., alpha test enable/disable, texture map content, user provided quality/performance controls, or the like. Adapting the antialiasing based on the rendering state improves efficiency since primitives that benefit from high quality antialiasing are shaded with more samples and other primitives are shaded with fewer samples, optimizing image quality and performance.

The invention has been described above with reference to specific embodiments. Persons skilled in the art, however, will understand that various modifications and changes may be made thereto without departing from the broader spirit and scope of the invention as set forth in the appended claims. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. The foregoing description and drawings are, accordingly, to be regarded in an illustrative rather than a restrictive sense.

The invention claimed is:

1. A computing device configured to shade graphics primitives using hybrid antialiasing, the computing device comprising:
   a rasterizer including a hybrid antialias control unit configured to:
      receive the graphics primitives;
      determine a number of supersample clusters that are used to antialias each pixel that intersects the graphics primitives;
      determine a number of multisamples that are used to process the graphics primitives for each one of the supersample clusters; and
      rasterize the graphics primitives to output a fragment for each pixel that intersects a graphics primitive; and
   a fragment processing unit coupled to the rasterizer and configured to shade the fragments using multiple passes through the fragment processing unit, wherein the fragment processing unit comprises a hardware parallel processing engine, and the number of multiple passes used to produce each hybrid-antialiased pixel that intersects the graphics primitives is less than or equal to the number of supersample clusters, and geometry computations performed when rasterizing the graphics primitive are not repeated for each pass through the fragment processing unit.

2. The computing device of claim 1, wherein the number of supersampled clusters is determined based on rendering state of the computing device.

3. The computing device of claim 2, wherein the rendering state includes one or more of a high quality mode setting, a high performance setting, an alpha testing setting, and using a texture map with high frequency content.

4. The computing device of claim 1, wherein the fragment processing unit is further configured to produce post-shader coverage that indicates which of the multisamples are covered by the graphics primitives for each one of the supersample clusters.

5. The computing device of claim 4, further comprising a raster operations unit that is coupled to the fragment processing unit and configured to z test the graphics primitives for each one of the multisamples that is covered by the graphics primitives, according to the post-shader coverage, to produce z tested values.

6. The computing device of claim 5, wherein the raster operations unit is further configured to compress the z tested values for a portion of a z buffer that intersects each one of the graphics primitives.

7. The computing device of claim 1, wherein the number of supersample clusters that are used to antialias each pixel that intersects a first one of the graphics primitives is different than the number of supersample clusters that are used to antialias each pixel that intersects a second one of the graphics primitives.

8. The computing device of claim 1, wherein the number of multiple passes used to produce each hybrid-antialiased pixel that intersects the graphics primitives does not include a pass for any supersample cluster without at least one multisample that is covered by the graphics primitives.

9. The computing device of claim 1, wherein the fragment processing unit is further configured to shade the fragments by computing a shaded value for only one of the multisamples in each one of the supersample clusters and duplicating the shaded value for the other multisamples within the same supersample cluster.

10. The computing device of claim 1, wherein the fragment processing unit is further configured to compute a shaded value for a first supersample cluster of the supersample clusters using a position of a first multisample within the first supersample cluster.

11. The computing device of claim 1, wherein the fragment processing unit is further configured to compute a shaded value for a first supersample cluster of the supersample clusters using a centroid that is a geometric centroid of the multisamples within the first supersample cluster that are covered by graphics primitives.

12. The computing device of claim 1, wherein the fragment processing unit is further configured to compute a shaded value for a first supersample cluster of the supersample clusters using an approximated centroid that is a multisample within the first supersample cluster that is covered by graphics primitives and closest to a geometric centroid of the first supersample cluster.

13. A method for shading primitives in a computing device, the method comprising:
    receiving a graphics primitive;
    determining a number of supersample clusters that are used to antialias each pixel that intersects the graphics primitive based on rendering state associated with a fragment processing unit within the computing device;
    rasterizing the graphics primitive to output a fragment for each pixel that intersects the graphics primitive; and
    shading the fragments using multiple passes through the fragment processing unit, wherein the number of multiple passes used to produce each antialiased pixel that intersects the fragments is less than or equal to the number of supersample clusters, and geometry computations performed when rasterizing the graphics primitive are not repeated for each pass through the fragment processing unit.

14. The method of claim 13, wherein the number of multiple passes used to produce each antialiased pixel that intersects the graphics primitive does not include a pass for any supersample cluster without at least one multisample that is covered by the graphics primitive.

15. The method of claim 14, wherein the number of supersample clusters is greater than one and less than or equal to the number of multisamples.

16. The method of claim 14, wherein the number of multisamples is greater than one and greater than the number of supersample clusters.

17. The method of claim 14, wherein a shaded value is computed for only one of the multisamples in each one of the supersample clusters and the shaded value is duplicated for the other multisamples within the same supersample cluster.

18. The method of claim 14, wherein a shaded value is computed for a first supersample cluster of the supersample clusters using a position of a first multisample within the first supersample cluster.

19. The method of claim 14, wherein a shaded value is computed for a first supersample cluster of the supersample clusters using a centroid that is a geometric centroid of the multisamples within the first supersample cluster that are covered by the graphics primitive.

20. The method of claim 13, wherein the rendering state includes one or more of a high quality mode setting, a high performance setting, an alpha testing setting, and using a texture map with high frequency content.

* * * * *